United States Patent
Kuvshynov et al.

(10) Patent No.: US 10,217,052 B2
(45) Date of Patent: Feb. 26, 2019

(54) EVALUATING FEATURE VECTORS ACROSS DISJOINT SUBSETS OF DECISION TREES

(71) Applicant: Facebook, Inc., Menlo Park, CA (US)

(72) Inventors: Oleksandr Kuvshynov, Los Altos Hills, CA (US); Aleksandar Ilic, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 973 days.

(21) Appl. No.: 14/699,657

(22) Filed: Apr. 29, 2015

(65) Prior Publication Data

US 2016/0321549 A1   Nov. 3, 2016

(51) Int. Cl.
*G06N 5/02*   (2006.01)
*G06K 9/00*   (2006.01)
*G06N 99/00*  (2010.01)

(52) U.S. Cl.
CPC .......... *G06N 5/025* (2013.01); *G06K 9/00* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 5,657,424 A | * | 8/1997 | Farrell | G10L 15/05 |
| | | | | 704/232 |
| 7,593,015 B2 | * | 9/2009 | Rao | G06F 17/30056 |
| | | | | 345/473 |

OTHER PUBLICATIONS

Dash et al. Feature Selection for Classification. Intelligent Data Analysis 1 (1997) 131-156 (Year: 1997).*
Mingers, John. An Empirical Comparison of Pruning Methods for Decision Tree Induction. Machine Learning, 4, 227-243 (1989) (Year: 1989).*

* cited by examiner

*Primary Examiner* — Alexey Shmatov
*Assistant Examiner* — Robert Bejcek, II
(74) *Attorney, Agent, or Firm* — FisherBroyles, LLP

(57) ABSTRACT

The disclosure is directed to evaluating feature vectors using decision trees. Typically, the number of feature vectors and the number of decision trees are very high, which prevents loading them into a processor cache. The feature vectors are evaluated by processing the feature vectors across a disjoint subset of trees repeatedly. After loading the feature vectors into the cache, they are evaluated across a first subset of trees, then across a second subset of trees and so on. If the values based on the first and second subsets satisfy a specified criterion, further evaluation of the feature vectors across the remaining of the decision trees is terminated, thereby minimizing the number of trees evaluated and therefore, consumption of computing resources.

13 Claims, 10 Drawing Sheets

EVALUATING FEATURE VECTORS ACROSS DISJOINT SUBSETS OF DECISION TREES

BACKGROUND

In computer programming, decision tree models are used to evaluate feature vectors. A feature vector can be a multi-dimensional vector of features, e.g., numerical features, each of which represents an aspect of an object, e.g., an age of a user of a social networking application. A decision tree is a flowchart-like structure that is modeled like a tree in which an internal node represents a "test" on an attribute, each branch represents the outcome of the test and each leaf node represents a value (e.g., decision taken after computing all attributes). Evaluating a feature vector using a decision tree can include traversing the nodes of the tree based on the features of the feature vector and arriving at a leaf node to obtain a value for the feature vector.

Typically, a feature vector is evaluated across a number of decision trees for obtaining more accurate results. In general, a large number of feature vectors are evaluated across multiple decision trees (e.g., "1000" feature vectors across "1000" trees). However, since a processor cache has limited storage space, not all the feature vectors and the decision trees can be loaded into the cache at once. The current techniques typically load the trees at once and evaluate the feature vectors one by one against all the trees. The problem with this approach is that if the decision trees are huge, e.g., includes a large number of nodes, the evaluation of the trees can be resource heavy, e.g., consumes processing and storage capacity.

Further, the current techniques represent the decision trees in computer programming languages as tree data structures, e.g., using linked lists, the processing of which can consume significant amount of computing resource. Furthermore, the current techniques do not optimize the decision trees to be optimized based on the feature vectors to be evaluated.

DETAILED DESCRIPTION

Figure 1:
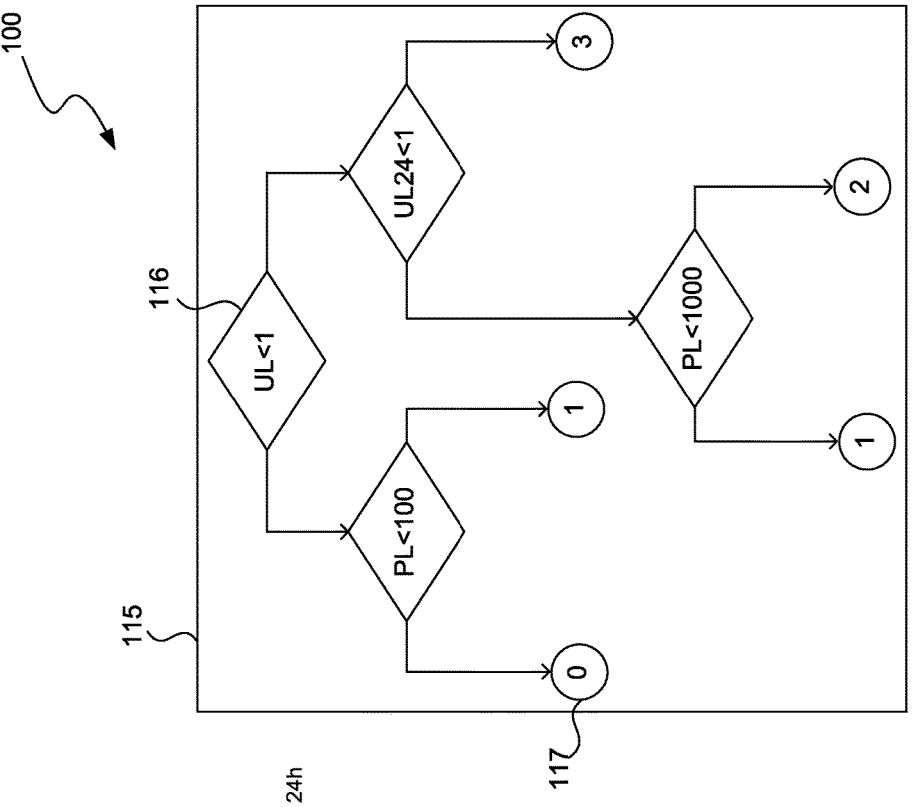
FIG. 1 is a block diagram illustrating an example of a feature vector and a decision tree, consistent with various embodiments.

Embodiments are disclosed for processing decision trees. The embodiments facilitate processing of number (n) of feature vectors across a number (m) of decision trees ("trees"). In some embodiments, a feature vector is a multi-dimensional vector of features, e.g., numerical features, each of which represents an aspect. For example, a feature vector in a social networking application can have features that represent a number of lifetime likes of a user, the number of likes by the user in a 24-hour period, and a number of friends the user has. In some embodiments, a decision tree is a flowchart-like structure that is modeled like a tree in which an internal node represents a "test" on an attribute, each branch represents the outcome of the test and each leaf node represents a value (e.g., decision taken after computing all attributes). In some embodiments, evaluating a feature vector using a decision tree includes traversing the nodes of the trees based on the features from the feature vector and arriving at a leaf node to obtain a value for the feature vector based on the decision tree. The decision trees can be used for various purposes. For example, in a social networking application, the decision trees can be used for predicting a probability that a user likes a specified page. In another example, the decision trees can be used for determining whether to suggest a specified user as a friend to another specified user.

Typically, the number of feature vectors and the number of decision trees are very high, which can prevent loading all the feature vectors and the decision trees into a cache memory of a computing device. In some embodiments, the feature vectors are processed more efficiently by processing n feature vectors across a disjoint subset of trees repeatedly. Typically, as a feature vector is evaluated through a number of decision trees one after the other, the effect a decision tree has on an initial value of the feature vector keeps diminishing. The embodiments can stop evaluating the trees when the effect of the evaluation on the value of the feature vector is below a specified threshold, thereby restricting the evaluation to boosted decision trees, e.g., decision trees that can have an impact on the value of a feature vector. In some embodiments, such an evaluation can be implemented using any of boost algorithms in which a collection of decision trees are trained in the serialized way.

The embodiments can load the n feature vectors and a first subset (k) of the m trees into the cache memory and process the n feature vectors across the first k trees in a first phase. In a second phase, the embodiments can evict the first k trees, load the second subset of k trees and process the n feature vectors across the second subset k of the m trees, and so on, e.g., until at least some subsets of the trees are evaluated.

In some embodiments, if a first value of a feature vector determined in the first phase and a second value of the feature vector determined in the second phase do not satisfy a criterion, e.g., a variation between the first value and the second value is below a specified threshold, the feature vector may not be evaluated using the remaining decision trees, thereby eliminating the need to process using the remaining the decision trees, which minimizes the consumption of computing resources and improves the processing speed. By loading subsets of the trees in successive phases, the embodiments can minimize (a) the number of trees that are loaded into the cache and (b) the number of evaluations to be performed, thereby improving the efficiency in evaluating the feature vectors.

The embodiments can further improvise the processing efficiency in evaluating the decision trees by generating a simplified version of the decision trees based on the feature vectors being evaluated. In some embodiments, the decision trees can be simplified based on the features that are common between the feature vectors. For example, if a feature vector "fv1" has features "f1"-"f4" as {2,0,10,1} and a feature vector "fv2" has the features "f1"-"f4" as {2,0,10,3}, then the features "f1"-f3" {2,0,10} are said to be common features between the feature vectors "fv1" and "fv2." The embodiments can identify common features among the n feature vectors, identify the path of the decision tree the common features evaluate to and load only the remaining portion of the tree into the cache memory. Since the path taken by the common features in the decision tree is the same for all the feature vectors that have the common features, the portion of the decision tree having a common path need not be evaluated for every feature vector that has those common feature vectors. Accordingly, the common path can be eliminated from the decision tree before the tree is used for evaluating the feature vectors. The embodiments can regenerate a simplified version of the decision tree without the common path and use the simplified version of the decision tree for evaluating the feature vectors. The processing of the feature vectors can start from a node of the decision tree following the common path. By removing the common path, the simplified version of the decision tree can have less instructions and consume less storage space, thereby minimizing the cache space consumed by the decision tree and an amount of time required to process the trees.

In some embodiments, the evaluating of the feature vectors across the trees can be cascaded, e.g., feature vectors can be evaluated using decision trees of a first model in a first phase, pruned based on results of the first phase, and then evaluated using decision trees of a second model in the second phase and so on.

In some embodiments, the processing of the decision trees can be further improvised by expressing a decision tree as a ternary expression, e.g., using ternary operators, in a computer programming language rather than a tree data structure, e.g., a linked list, a binary tree data structure. In some embodiments, representing the decision tree as a ternary expression rather than the tree data structure can reduce the size of the tree, e.g., number of instructions to be processed. In some embodiments, the size of the decision tree can be further reduced by using additional operators, e.g., categorical expressions "==", "in_set", "between", in the ternary expressions, which can minimize the number of evaluations that are otherwise performed in the absence of these expressions.

Turning now to the figures, FIG. 1 is a block diagram illustrating an example 100 of a feature vector and a decision tree, consistent with various embodiments. In some embodiments, a feature vector is a multi-dimensional vector of features, e.g., numerical features, each of which represents an aspect. For example, a feature vector in a social networking application can have features that represent a number of lifetime likes of a user, the number of likes by the user in a "24" hour period, and a number of friends the user has. The example 300 illustrates a feature vector 105 in a social networking application having three features. A first feature 106, "UL," can indicate a number of pages in the social networking application a user of the social networking application has liked. A second feature 107, "UL24," can indicate the number of pages liked by the user in a "24" hour period. A third feature 108, "PL," can indicate the number of likes a page in the social networking application has received.

The feature vectors 110 are examples of the feature vector 105 and are generated for a specified user. Each of the feature vectors 110 contains the values of the features for the specified user for a specified page. For example, the features "2", "0" and "10" in the first feature vector "fv1" indicate that the specified user has liked "2" pages in total and "0" pages in a "24" hour period, and the number of likes a first page has received is "10." Similarly, the other feature vectors "fv2" to "fvn" indicate the features for the specified user for a corresponding page of the social networking application. The feature vectors 110 can be used for performing various analyses in the social networking application. For example, the feature vectors 110 can be used to determine a probability of the specified user liking a specified page of the social networking application. In some embodiments, such analysis can be performed using one or more decision trees, e.g., decision tree 115.

As describe above, a decision tree can be a flowchart-like structure that is modeled like a tree in which an internal node represents a "test" on an attribute, where each branch can represent the outcome of the test and each leaf node can represent a value (e.g., decision taken after computing all attributes). For example, in the decision tree 115, a node 116 can represent a test that checks if the feature "UL" is lesser than "1." The value in the leaf nodes, e.g., leaf node 117, of the decision tree 115 can represent a probability value or a value that can be used to determine a probability the specified user likes the corresponding page.

In some embodiments, evaluating a feature vector, e.g., "fv1," using a decision tree, e.g., decision tree 115, includes traversing the nodes of the tree based on the features of the feature vector "fv1" and arriving at a leaf node to obtain a value for the feature vector "fv1" that indicates a result of evaluation of the feature vector "fv1" based on the decision tree 115. In some embodiments, a number of decision trees can be used for performing the analysis. For example, for determining a probability the specified user likes a first page, the feature vector "fv1" may be evaluated using m number of trees. When the feature vector "fv1" is evaluated using the m number of decision trees, m number of values is generated, e.g., one for each of the m evaluations. In some embodiments, the final value of the feature vector "fv1", e.g., the probability the specified user likes the first page, is determined as a function of the m number of values, e.g., a weighted sum of the m number of values. Similarly, the other feature vectors, "fv2"-"fvn" are evaluated using the m decision trees to obtain their corresponding values.

Figure 2:
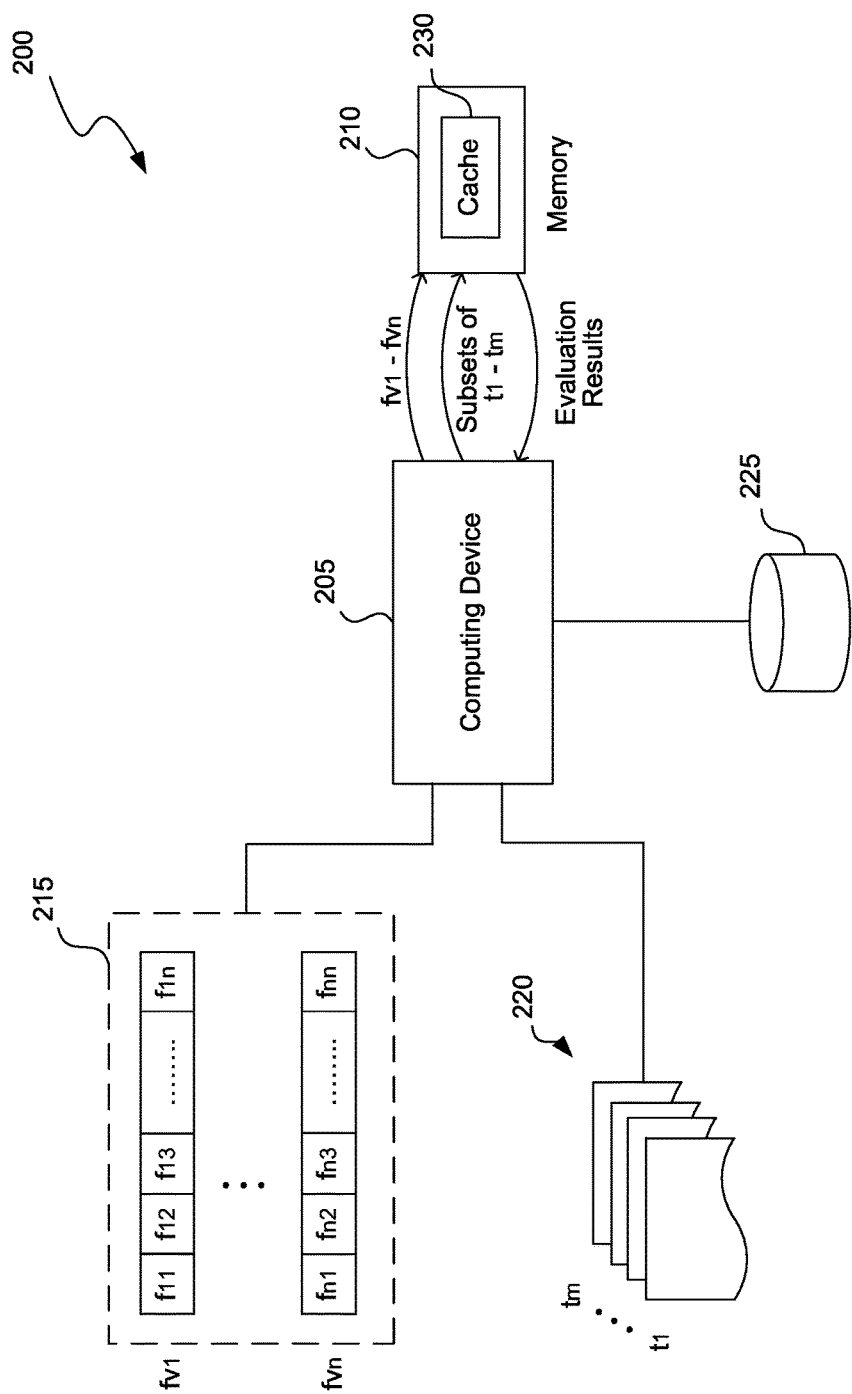
FIG. 2 is an environment in which the evaluation of the feature vectors using the decision trees can be implemented.

FIG. 2 is an environment in which the evaluation of the feature vectors using the decision trees can be implemented. The environment 200 includes a computing device, e.g., computing device 205, that can be used for evaluating the feature vectors, e.g., feature vectors 215. In some embodiments, the feature vectors 215 are similar to the feature vectors 110 of FIG. 1. The feature vectors 215 can be evaluated using m number of decision trees, e.g., decision trees 220. In some embodiments, the decision trees 220 can include a decision tree such as the decision tree 115 of FIG. 1. In some embodiments, the computing device 205 is a server computing device in a social networking application that performs various functionalities of the social networking application.

The environment 200 includes a storage system 225, which can be used to store the feature vectors 215, the decision trees 220 and any other data necessary for evaluating the feature vectors 215. The computing device 205 includes a memory 210 into which the feature vectors 215 and the decision trees 220 are loaded for performing the evaluation. Although the memory 210 is shown external to the computing device 205, the configuration of the computing device 205 and the memory 210 is not limited to such an arrangement. The memory 210 or a portion thereof can be physically located within the computing device 205 and/or outside the computing device 205. The computing device 205 loads the feature vectors 215 and the decision trees 220 into a cache 230 of the memory 210, which is typically a portion of the memory 210 that provides faster read and/or write access to the data compared to the remaining portion of the memory 210.

Since the cache 230 contains limited storage space, the number of feature vectors 215 and the decision trees 220 that can be loaded into the cache 230 can be dependent on the available storage space in the cache 230. The computing device 205 can address this problem by adopting various methods by: loading all the feature vectors at once and some decision trees in batches; all the decision trees at once and some feature vectors in batches; or some of both in batches. Different methods have different efficiencies in performing the evaluations. In some embodiments, the computing device 205 loads all the feature vectors 215 into the cache 230 at once and loads disjoint subsets of the decision trees 220 in successive batches to obtain an optimum efficiency in evaluating the feature vectors 215. One of the reasons why loading the subsets of the decision trees 220 in batches can be efficient is, the effect of the decision trees on the values of the feature vectors 215 can diminish as the feature vectors 215 are evaluated across more and more subsets of the decision trees. After a certain stage, e.g., when a variation in the values of the feature vectors 215 between the subsets of the decision trees is below a specified threshold, the evaluation of the feature vectors 215 may be terminated. That is, the feature vectors 215 may not be evaluated using the remaining of the decision trees, thereby minimizing the consumption of computing resources. Additional details with respect to evaluating the feature vectors 215 using subsets of the decision trees 220 is described at least in association FIG. 3.

Figure 3:
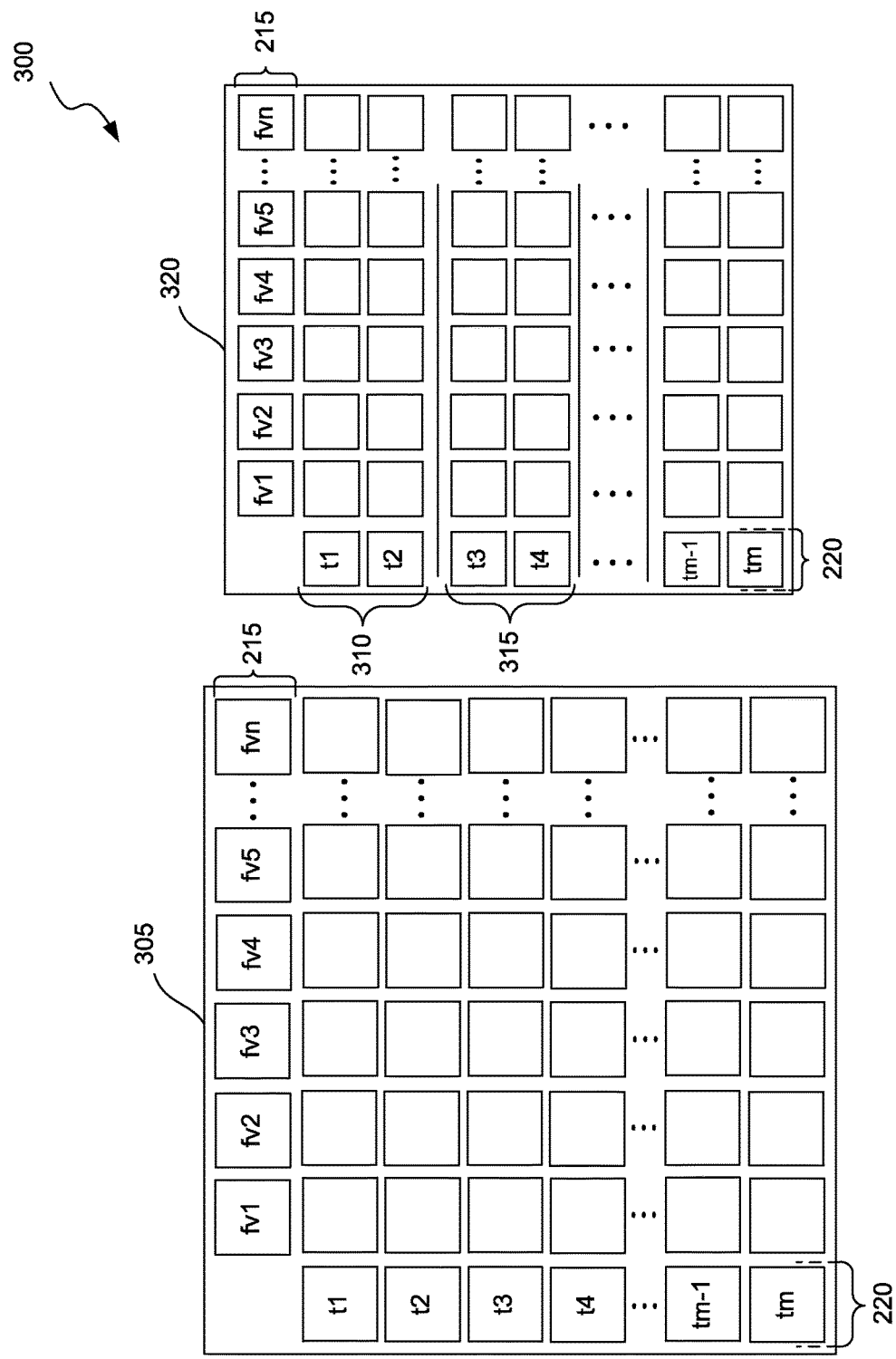
FIG. 3 is a block diagram illustrating an example for evaluating features vectors using subsets of decision trees, consistent with various embodiments.

FIG. 3 is a block diagram 300 illustrating an example for evaluating features vectors using subsets of decision trees, consistent with various embodiments. In some embodiments, the example can be implemented in the environment 200 of FIG. 2. The computing device 205 can evaluate the n feature vectors 215 using m decision trees 220 as illustrated in example 305. In some embodiments, that cache 230 does not have enough storage space to store all of the n feature vectors 215 and m decision trees 220, and therefore, the computing device 205 does not load all of the n feature vectors 215 and m decision trees 220.

The computing device 320 can evaluate the feature vectors 215 using subsets of the decision trees 220 in different phases. As illustrated in example 320, the computing device 205 can load the feature vectors 215 and a first subset 310 of the decision trees 220 into the cache 230 and evaluate the feature vectors 215 across the first subset 310 of the decision trees 220 in a first phase. The values of each of the feature vectors 215 in the first phase are stored in the cache 230 or somewhere else in the memory 210 as a first result. In a second phase, the computing device 205 can evict the first subset 310 of the decision trees 220 from the cache 230, load the second subset 315 of the decision trees 220 and evaluate the feature vectors 215 across the second subset 315 of the decision trees 220. The values of each of the feature vectors 215 in the second phase are stored in the cache 230 or somewhere else in the memory 210 as a second result. The evaluation of the feature vectors 215 is continued similarly, e.g., until at least some subsets of the decision trees 220 are evaluated.

The evaluation of the feature vectors 215 can be terminated after a specified phase if a specified criterion is satisfied. For example, if a variation between the first value of a feature vector, which is generated by evaluating the feature vector using the first subset 310 of trees, and the second value of the feature vector, which is generated by evaluating the feature vector using the second subset 315 of trees, is below a specified threshold, the feature vector may not be evaluated using the remaining of the decision trees 220. By processing the feature vectors 215 across only some of the decision trees 220, e.g., trees that have an impact on the values of the feature vectors 215, the need to evaluate the feature vectors 215 across all the decision trees 220 is eliminated, thereby minimizing a consumption of the computing resources, e.g., processing capacity, storage space, time, in processing the feature vectors 215. Accordingly, loading subsets of the trees in successive phases, can minimize (a) the number of trees that are loaded into the cache 230 and (b) the number of evaluations to be performed, thereby improving the efficiency in evaluating the feature vectors 215.

In evaluating the trees in a particular phase, the order in which the feature vectors 215 are evaluated across the subset can be any—either each feature vector is evaluated across all the trees of the subset before moving on to the next feature or all the feature vectors are evaluated across a tree of the subset before moving on to the next tree. In some embodiments, the computing device 205 evaluates each of the feature vectors 215 across a first tree of the subset, before moving on to the next tree of the subset.

Each of the subsets of the decision trees 220 can include up to a specified number of decision trees, e.g., k number of trees. In some embodiments, the number k is determined as a function of one or more of a size of the cache 230, available storage space in the cache 230, a total number (m) of the decision trees 220, a number n of the feature vectors, or a user defined criterion.

Figure 4:
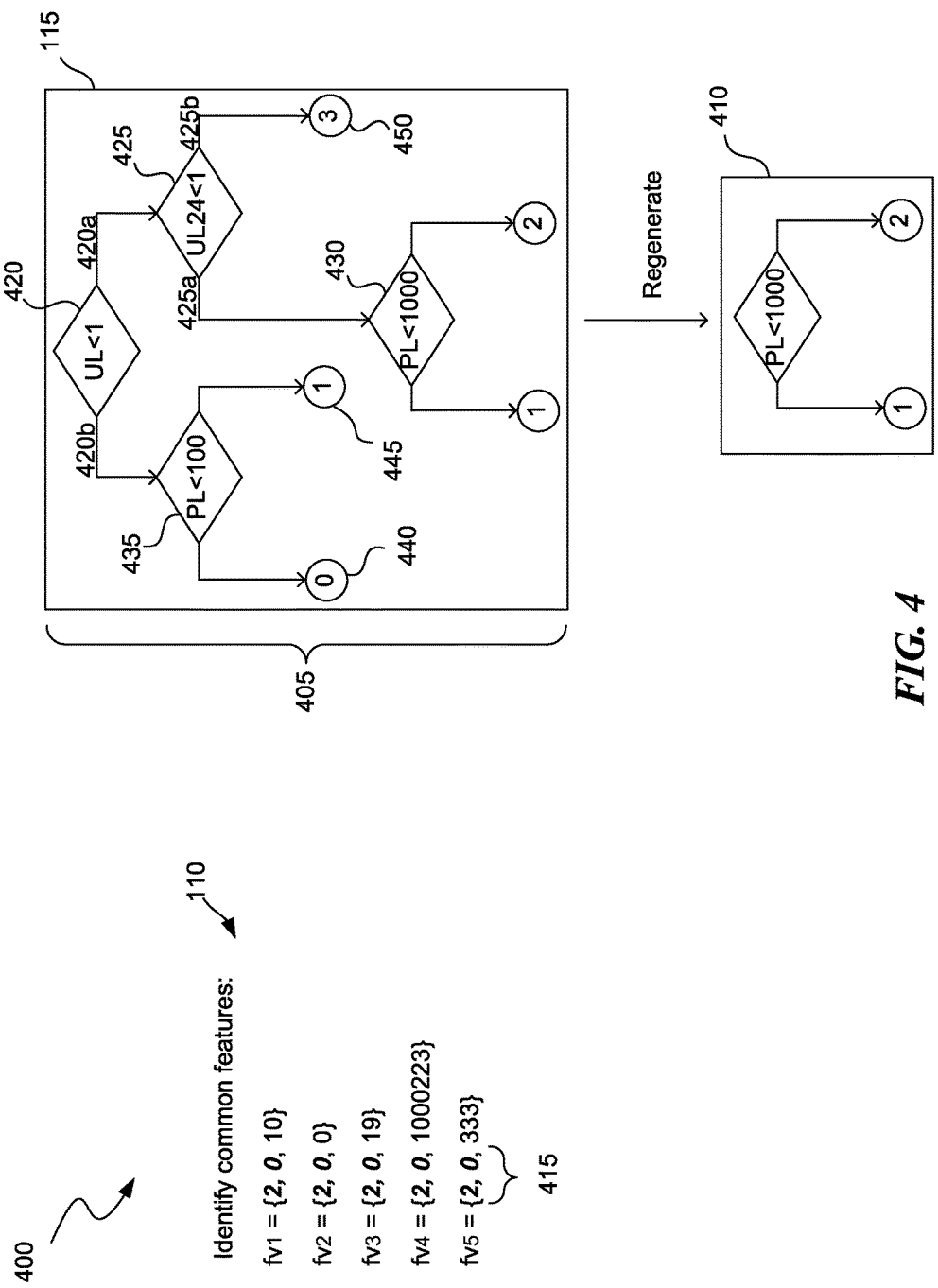
FIG. 4 is a block diagram illustrating an example for simplifying a decision tree, consistent with various embodiments.

FIG. 4 is a block diagram illustrating an example 400 for simplifying a decision tree, consistent with various embodiments. In some embodiments, the example 400 can be implemented in the environment 200 of FIG. 2. As described at least with reference to FIG. 1 above, evaluating a decision tree includes traversing the tree by evaluating the nodes, e.g., which includes conditions or tests, of the trees until a leaf node is reached, which includes a value. The higher the number of conditions to be checked, the longer the time taken to evaluate the decision tree and the more the amount of storage space consumed by the decision tree.

In some embodiments, the computing device 205 can simplify a decision tree by eliminating a portion of the decision tree, e.g., a portion that common features between two or more feature vectors evaluate to. For example, the computing device 205 can identify a common path of the decision tree at least some of the features in the two or more features evaluate to and remove the common path from the decision tree before it is loaded to the cache 230.

The example 400 illustrates identifying a path in the decision tree 115 of FIG. 1 to which the common features among the feature vectors "fv1"-"fv5" evaluate to. Recall from FIG. 1 that the three features in each of the feature vectors 110 correspond to "UL", which indicates a number of pages in the social networking application a user of the social networking application has liked in total, "UL24," which indicates the number of pages liked by the user in a "24" hour period and "PL," which indicates the number of likes a page in the social networking application. The computing device 205 identifies that the features "2" and "0," which correspond to "UL" and "UL24," as common features 415 among the feature vectors "fv1"-"fv5."

The computing device 205 identifies a path in the decision tree 115 the common features 415 evaluate to. For example, at a first node 420, the feature "UL" in the common features 415, which has a value "2," evaluates to the path 420a. At a second node 425, the feature "UL24" in the common features 415, which has a value "0," evaluates to a third node 430 via the path 425a. Accordingly, the computing device 205 identifies the path 420a and 425a as the path the common features 415 evaluate to. The computing device 205 then regenerates a simplified decision tree 410 by removing a portion 405 of the decision tree 115, e.g., the nodes along the path 420a and 425a up until to the third node 430 to which the common features 415 evaluate to. The computing device 205 also removes the nodes along the path which the common features 415 would not evaluate to. For example, the computing device removes the nodes along the path 420b and 425b as the common features 415 do not evaluate to those nodes.

In some embodiments, the computing device 205 loads the simplified decision tree 410 into the cache 230 and evaluates only the non-common features of the feature vectors 110. In some embodiments, the simplified decision tree 410 so generated includes fewer instructions, e.g., instructions for evaluating only the non-common features, and therefore, can be processed much faster than the decision tree 115 which includes instructions for evaluating all of the features of the feature vectors 110. Further, since the simplified decision tree 410 has fewer instructions than the decision tree 115, it consumes less storage space in the cache 230.

In some embodiments, simplifying the decision trees as described above can improve the efficiency in evaluating the feature vectors significantly, e.g., when the number of feature vectors and/or the decision trees are significantly large. For example, if the portion 405 to be removed, i.e., the path the common features 415 evaluate to, exist in a number of decision trees, then those decision trees can also be simplified, which can minimize the amount of resources consumed, e.g., time, processing capacity and storage capacity, consumed in evaluating the feature vectors 110 based on the simplified trees.

In some embodiments, evaluating the decision tree can be further optimized by expressing a decision tree as a ternary expression, rather than a tree data structure, in a computer programming language. For example, the decision tree 115 can be expressed using the following ternary expression:

$$(f(UL)<1?(f(UL24)<1?3:(f(PL)<1000?2:1)):(f(PL)<100?1:0))$$

In some embodiments, the ternary expressions are processed faster than the tree data structures. In some embodiments, a ternary expression can be further optimized by using categorical expressions, e.g., "==," "in_set" or "between." Note that the categorical expressions listed above are examples and that they can assume different syntax in different computer programming languages. In some embodiments, the categorical operation, such as "in_set" can be useful when the feature values are strings. For example, to determine whether a particular country is in a given set, the categorical expression "in_set" may be used. An example ternary expression using the categorical expression can be: "f(country) in_set (Japan, USA, Australia) ? x: y."

By using the categorical expressions in addition to the operators such as "<," ">", a number of instructions in a decision tree can be reduced. For example, consider a ternary expression to determine if a variable "x" has a value between 50 and 100. The ternary expression without the categorical expression can be:

$$f(x)>50?(f(x)<100?1:0):0$$

The above ternary expression can require at least two checks, e.g., (f(x)>50) and (f(x)<100). However, if the ternary expression is constructed using the categorical expression, the number of checks can be reduced as follows:

$$f(x) \text{ between } (50 \ \& \ 100)?1:0$$

Accordingly, the efficiency in evaluation of the decision trees 220 can be improved by expressing the decision trees 220 using ternary expressions with categorical expressions.

In some embodiments, the evaluating the decision tree can be further optimized by facilitating the computing device 205 to predict the branches of the decision tree, that is, a specific branch of the if/then/else ternary expression the feature vector can evaluate to, e.g., by annotating a source code of the decision tree with keywords such as "LIKELY" and "UNLIKELY" to indicate to the computing device 205 which of the branches the feature vector is likely to evaluate to. For example, if the source code "f(x)>50 ? (f(x)<100 ? 1:0): 0" is annotated as "LIKELY f(x)>50 ? UNLIKELY (f(x)<100 ? 1:0): 0," it indicates to the computing device 205 that a feature vector is likely to evaluate at node "f(x)>50" to the branch "0" and unlikely to evaluate to the branch (f(x)<100).

Figure 5:
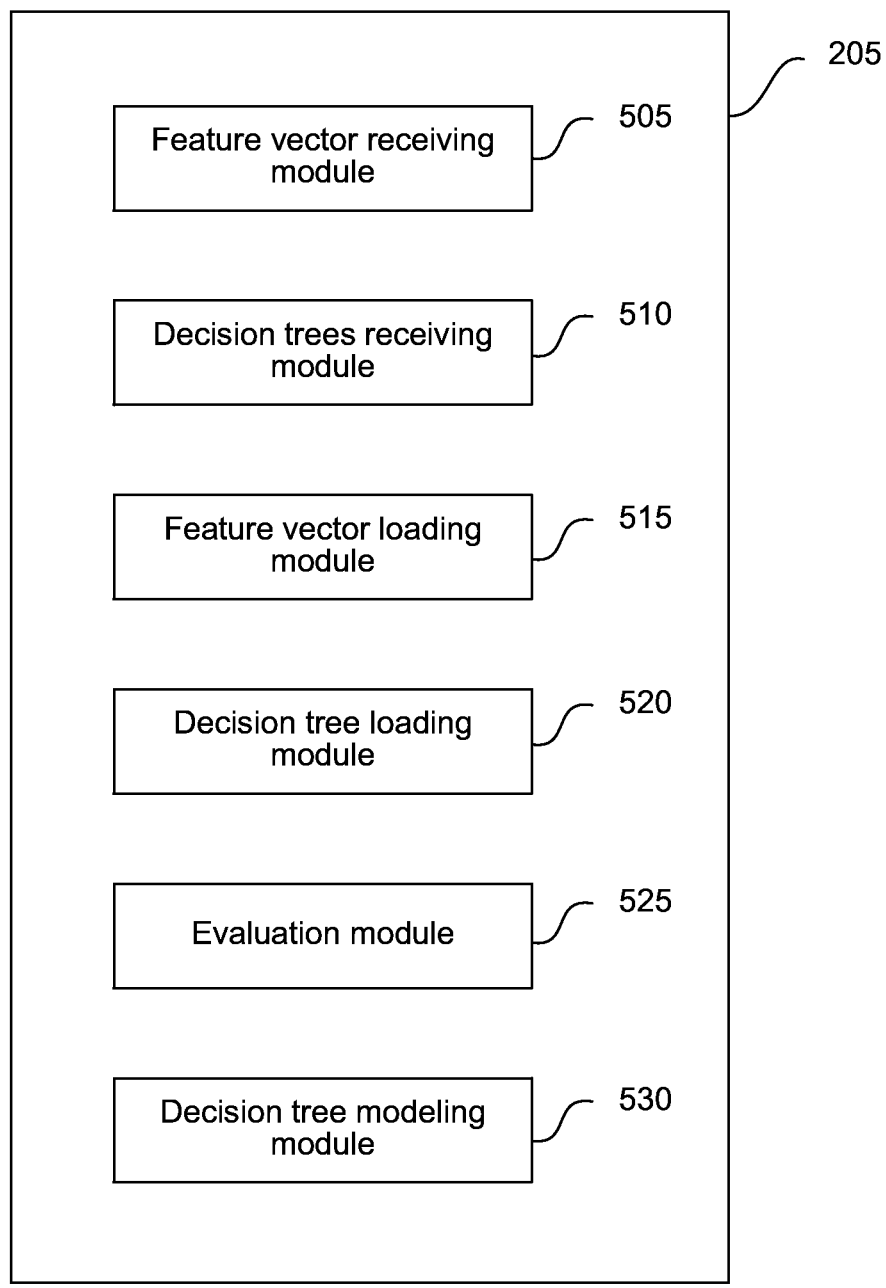
FIG. 5 is a block diagram of the computing device of FIG. 2, consistent with various embodiments.

FIG. 5 is a block diagram of the computing device of FIG. 2, consistent with various embodiments. The computing device 205 includes a feature vector receiving module 505 to obtain feature vectors, e.g., feature vectors 215 or feature vectors 110, from a source, e.g., storage system 225.

The computing device 205 includes a decision tree receiving module 510 to obtain decision trees, e.g., decision trees 220, using which the feature vectors are to be evaluated. The decision tree receiving module 510 can obtain the decision trees from a source, e.g., storage system 225.

The computing device 205 includes a feature vector loading module 515 that can load the feature vectors into a cache 230 of the memory 210. The computing device 205 includes a decision tree loading module 520 that can load the decision trees 220 into the cache 230. In some embodiments, the decision tree loading module 520 loads the decision trees 220 into the cache 230 by loading subsets of the decision trees 220 in successive batches, e.g., as described at least with reference to FIG. 3.

The computing device 205 includes an evaluation module 525 that can evaluate the feature vectors 215 loaded into the cache 230 using the decision trees 220, e.g., as described at least with reference to FIG. 1.

The computing device 205 includes a decision tree modeling module 530 that can model a tree based on various criteria. For example, the decision tree modeling module 530 can simplify a decision tree by removing a portion of the decision tree a set of common features between the feature vectors evaluate to, e.g., as described at least with reference to FIG. 4. Further, in some embodiments, the decision tree modeling module 530 can generate different subsets of the decision trees 220 in different models. For example, a first subset of the trees can be generated using a first model and a second subset of trees using a second model. In some embodiments, the evaluation of the feature vectors can be cascaded with different models of trees at different phases of evaluation.

Additional details with respect to the modules of the computing device 205 are described at least with reference to FIGS. 6-9 below. Note that the computing device 205 illustrated in FIG. 5 includes six modules. However, the number of modules is not restricted to the above number. The computing device 205 can include lesser number of modules, e.g., functionalities of two modules can be combined into one module, or can include more number of modules, e.g., modules that perform other functionalities. In some embodiments, the functionalities of one or more of the above modules can be split into two or more modules.

Figure 6:
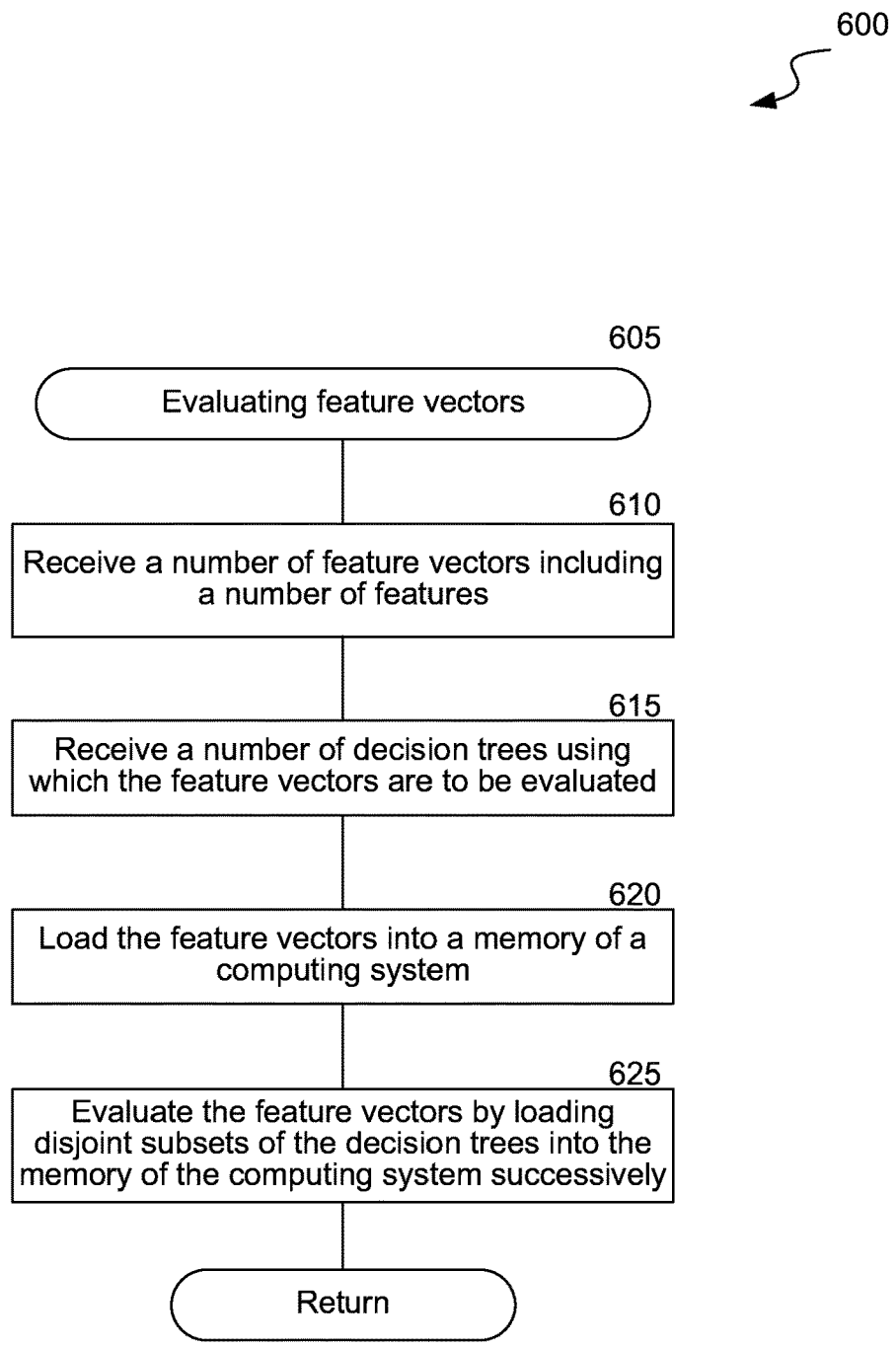
FIG. 6 is a flow diagram of a process of evaluating the feature vectors using decision trees, consistent with various embodiments.

FIG. 6 is a flow diagram of a process 600 of evaluating feature vectors using decision trees, consistent with various embodiments. The process 600 may be executed in the environment 200 of FIG. 2. The process 600 begins at block 605, and at block 610, the feature vector receiving module 505 of the computing device 205 obtains a number of feature vectors, e.g., feature vectors 215, from the storage system 225.

At block 615, the decision tree receiving module 510 obtains a number of decision trees, e.g., decision trees 220, from the storage system 225.

At block 620, the feature vector loading module 515 loads the feature vectors into a processor cache of the computing device 205, e.g., cache 230, for evaluating the feature vectors using the decision trees.

At block 625, the evaluation module 525 evaluates the feature vectors 215 using the decision trees 220. In some embodiments, the evaluation module 525 evaluates the feature vectors 215 across the decision trees 220 in phases, e.g., by evaluating the feature vectors 215 across different subsets of the decision trees 220 in different phases. Additional details regarding the method of evaluating the feature vectors in phases is described at least with reference to FIG. 7.

Figure 7:
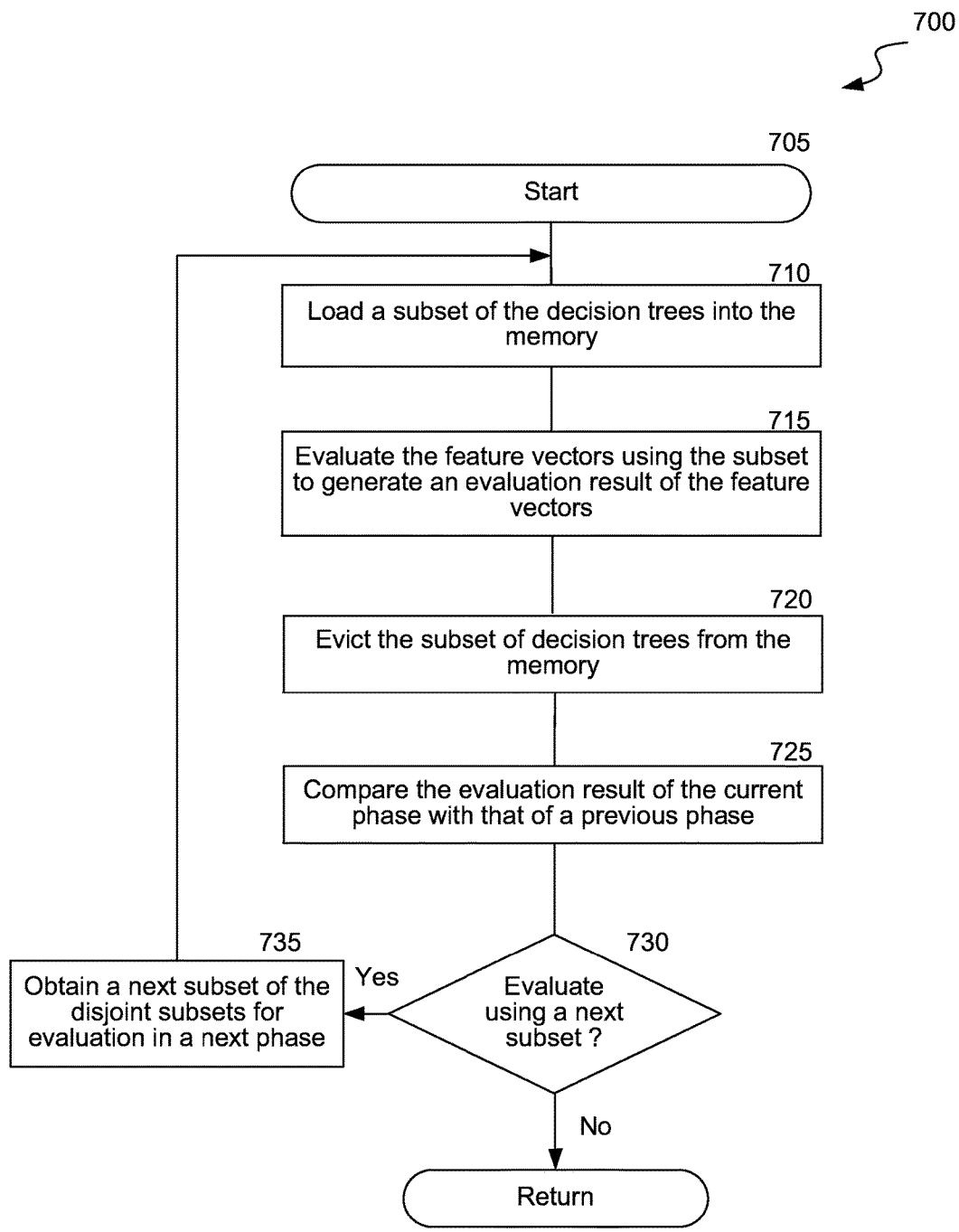
FIG. 7 is a flow diagram of a process of evaluating the feature vectors in multiple phases, consistent with various embodiments.

FIG. 7 is a flow diagram of a process 700 of evaluating the feature vectors in multiple phases, consistent with various embodiments. The process 700 may be executed in the environment 100 of FIG. 1. For brevity, the process 700 is described in association with FIGS. 1 and 3. In some embodiments, the process 700 may be performed by the computing device 205 as part of the process 600 at block 625. A phase of evaluating the feature vectors begins at block 705, and at block 710, the decision tree loading module 520 loads one of the many subsets of the decision trees, e.g., first subset 310 of the decision trees 220 of FIG. 3, into the cache 230.

At block 715, the evaluation module 525 evaluates the feature vectors 215 across the first subset 310 of the decision trees 220. As described at least with reference to FIG. 1, evaluating a feature vector, e.g., "fv1," using a decision tree, e.g., decision tree 115, includes traversing the nodes of the tree based on the features of the feature vector "fv1" and arriving at a leaf node to obtain a value for the feature vector "fv1" that indicates a result of evaluation of the feature vector "fv1" based on the decision tree 115. The values of each of the feature vectors determined using the subset of the trees are stored either in the cache 230 or elsewhere in the memory 210.

In evaluating the trees across a set of trees, the order in which the feature vectors 215 are evaluated across the set can be any—either each feature vector is evaluated across all the trees of the set before moving on to the next feature or all the feature vectors are evaluated across a tree of the set before moving on to the next tree of the set. In some embodiments, the evaluation module 525 evaluates each of the feature vectors 215 across a first tree of the set, before moving on to the next tree of the set.

At block 720, the decision tree loading module 520 evicts the subset of the of the decision trees from the cache 230.

At block 725, the evaluation module 525 compares the values of the feature vectors 215 computed in the current phase with the values of the feature vectors 215 computed in a previous phase.

At determination block 730, the evaluation module 525 determines whether to evaluate the feature vectors 215 with another subset of the decision trees 220 based on a result of the comparison. The evaluation module 525 terminates the evaluation if the comparison result satisfies a specified criterion. For example, the specified criterion to terminate the evaluation can be if a variation between the value in the current phase and that of the previous phase is below a specified threshold.

If the evaluation module 525 determines that the comparison result does not satisfy the specified criterion to terminate the evaluation, at block 735, the evaluation module 525 instructs the decision tree loading module 520 to obtain a next subset of the decision trees 220 for evaluating the feature vectors 215 across the next subset of the decision trees 220 in a next phase, and the control is transferred to block 710. Referring back to block 735, if the evaluation module 525 determines that the comparison result satisfies the specified criterion to terminate the evaluation, the process 700 terminates.

In some embodiments, the comparison results of some of the feature vectors may satisfy the specified criterion and some may not, in which case the evaluation module 525 terminates the evaluation for those of the feature vectors whose comparison results satisfy the specified criterion and continues with next phase of evaluation for the other feature vectors.

When a feature vector "fv1" is evaluated using k number of decision trees in a particular phase, k number of values is generated, e.g., one for each of the k evaluations. The value of the feature vector "fv1" at the particular phase, $PR_t(fv)$, is determined as a function of the k number of values, where "t" is a phase number can have a value from "0" to "x". If the feature vector is evaluated across a number of subsets of the decision trees, then a number of phase results, e.g., $PR_1$, $PR_2$, can be generated for the feature vector. In some embodiments, the final result, FR(fv), of evaluation of the feature vector "fv1" is determined as a function of the $PR_{t=0-x}$ phase results of the feature vector.

Figure 8:
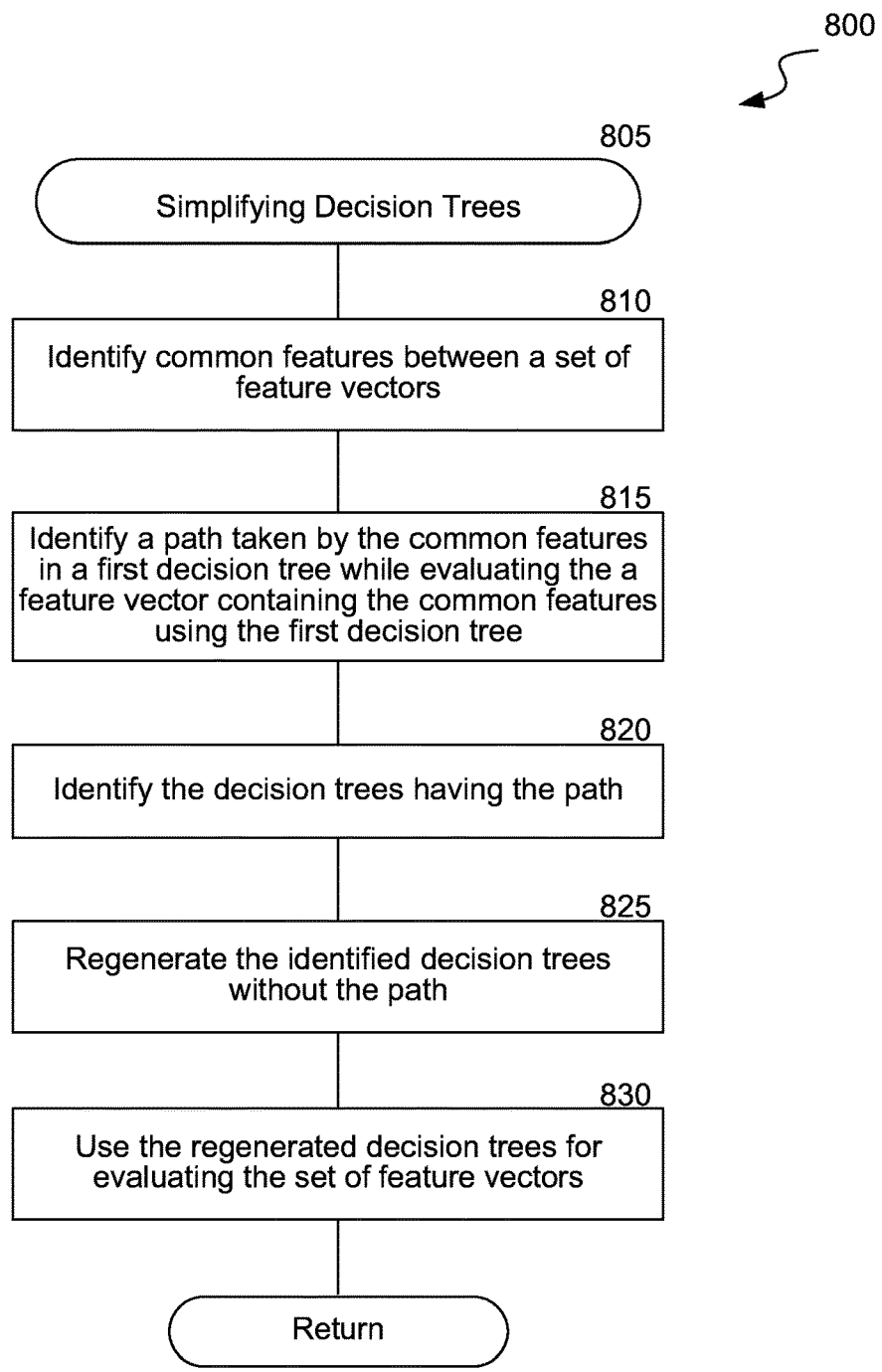
FIG. 8 is a flow diagram of a process of simplifying a decision tree, consistent with various embodiments.

FIG. 8 is a flow diagram of a process 800 of simplifying a decision tree, consistent with various embodiments. The process 800 may be executed in the environment 200 of FIG. 2. For brevity, the process 800 is described in association with FIG. 4. The process 800 begins at block 805, and at block 810, the decision tree modeling module 530 identifies common features, e.g., common features 415, among a number of candidate feature vectors, e.g., feature vectors 110, to be evaluated.

At block 815, the evaluation module 525 identifies a path of a decision tree, e.g., decision tree 115, the common features 415 evaluate to as a common path. In some embodiments, identifying the common path of the decision tree includes identifying a set of nodes, starting from a source node that evaluates a first feature of the common features 415 up to a destination node to which a last feature of the common features 415 evaluates to, along the common path. In the example 400, the common path includes paths 420a and 425a and the set of the nodes along the common path includes nodes 420 and 425. Further, identifying the common path can also include identifying another set of nodes, starting from a source node that evaluates the first feature of the common features 415 up to the destination node to which the last feature of the common features 415 evaluates to, that appear along a path which the common features would not evaluate to. In the example 400, the set of the nodes that appear along the path which the common features would not evaluate to includes nodes 435-450 along the path 420b and 425b.

At block 820, the decision tree modeling module 530 identifies other decision trees among the decision trees 220 that have the common path.

At block 825, the decision tree modeling module 530 regenerates the identified decision trees without the common path. For example, as illustrated in FIG. 4, the decision tree modeling module 530 regenerates the decision tree 115 as a simplified decision tree 410 by removing a portion, e.g., portion 405, of the decision tree 115 that includes the set of nodes along the common path and the set of nodes along the path the common features would not evaluate to. After the decision tree modeling module 530 simplifies at least some of decision trees, e.g., by regenerating them without the common path, the decision tree loading module 520 loads the simplified trees into the cache 230.

At block 830, the evaluation module 525 uses the simplified trees for evaluating the feature vectors.

Figure 9:
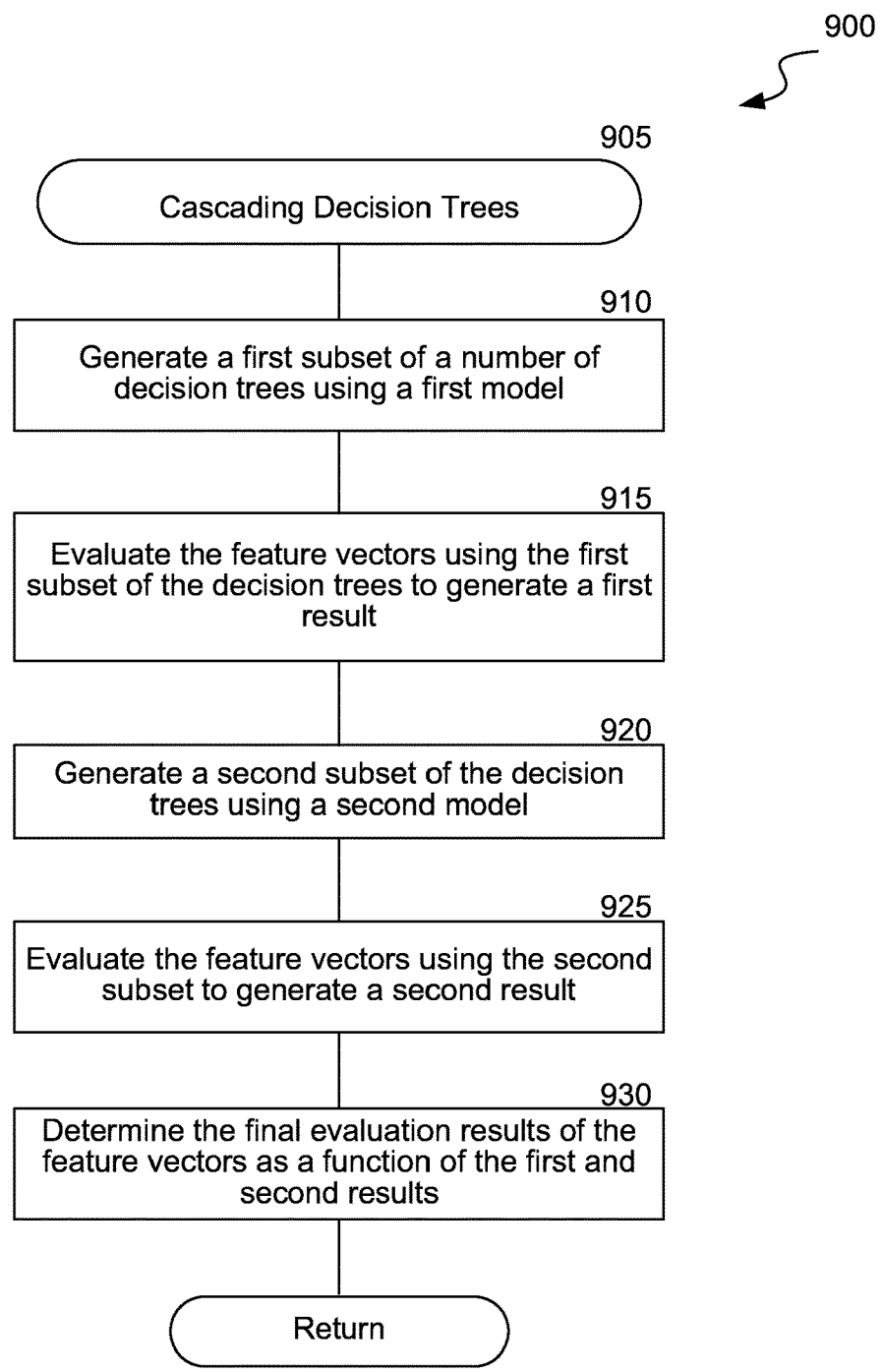
FIG. 9 is a flow diagram of a process of evaluating feature vectors by cascading the evaluation across different models of the decision trees, consistent with various embodiments.

FIG. 9 is a flow diagram of a process 900 of evaluating feature vectors by cascading the evaluation across different models of the decision trees, consistent with various embodiments. The process 900 may be executed in the environment 200 of FIG. 2. Recall at least from FIGS. 3 and 6 that the feature vectors can evaluated across the decision trees in multiple phases. For example, as described in FIG. 3, the feature vectors 215 can be evaluated across a first subset 310 of decision trees 220 in a first phase, and across a second subset 315 of decision trees 220 in a second phase. In some embodiments, the decision trees 220 can be generated using various models, but all of them are used to evaluate the feature vectors 215 for a common goal.

In some embodiments, the feature vectors 215 are used in a social networking application for suggesting friends to a specific user. Suggesting a friend to the specific user can include determining a first probability that the specific user would send a friend request to a suggested friend, and determining a second probability that the suggested friend accepts the friend request from the specific user. In some embodiments, the first probability can be determined by evaluating the feature vectors 215 using a set of decision trees that is generated based on a first model, e.g., a model in which the decision trees are constructed from a perspective of the specific user to whom the friend suggestions are sent. Similarly, the second probability can be determined by evaluating the feature vectors 215 using the set of decision trees that is generated based on a second model, e.g., a model in which the decision trees are constructed from a perspective of a friend to whom the specific user has sent the friend request. The computing device 205 can then determine whether to send a particular friend suggestion to the specific user as a function of the first and second probabilities.

The process 900 begins at block 905, and at block 910, the decision tree modeling module 530 generates a set of decision trees, e.g., a first subset 310 of the decision trees 220, based on a first model.

At block 915, in a first phase of evaluation, the evaluation module 525 evaluates the feature vectors 215 using the first subset 310 of decision trees 220. The evaluation module 525 stores the values of the feature vectors 215 generated in the first phase in the memory 210.

At block 920, the evaluation module 525 generates a second subset of the decision trees, e.g., the second subset 315 of the decision trees 220, based on a second model.

At block 925, in a second phase of evaluation, the evaluation module 525 evaluates the feature vectors 215 using the second subset 315 of the decision trees 220. The evaluation module 525 stores the values of the feature vectors 215 generated in the second phase in the memory 210.

At block 930, the evaluation module 525 determines a final value of the feature vectors 215 as a function of the values generated in the first and second phases, and the process 900 returns.

In some embodiments, the evaluation module 525 prunes the feature vectors 215 based on the values generated in a current phase before evaluating the feature vectors 215 using another subset of the decision trees in the next phase. In some embodiments, pruning the feature vectors 215 based on the values can including sorting the features in the feature vectors based on a specified criterion.

In some embodiments, the complexity of the model of the decision trees used for evaluating the feature vectors can increase as the number of phases in evaluating the feature vectors increase. For example, the decision trees used in the second phase can be more complex than the decision trees used in the first phase.

Figure 10:
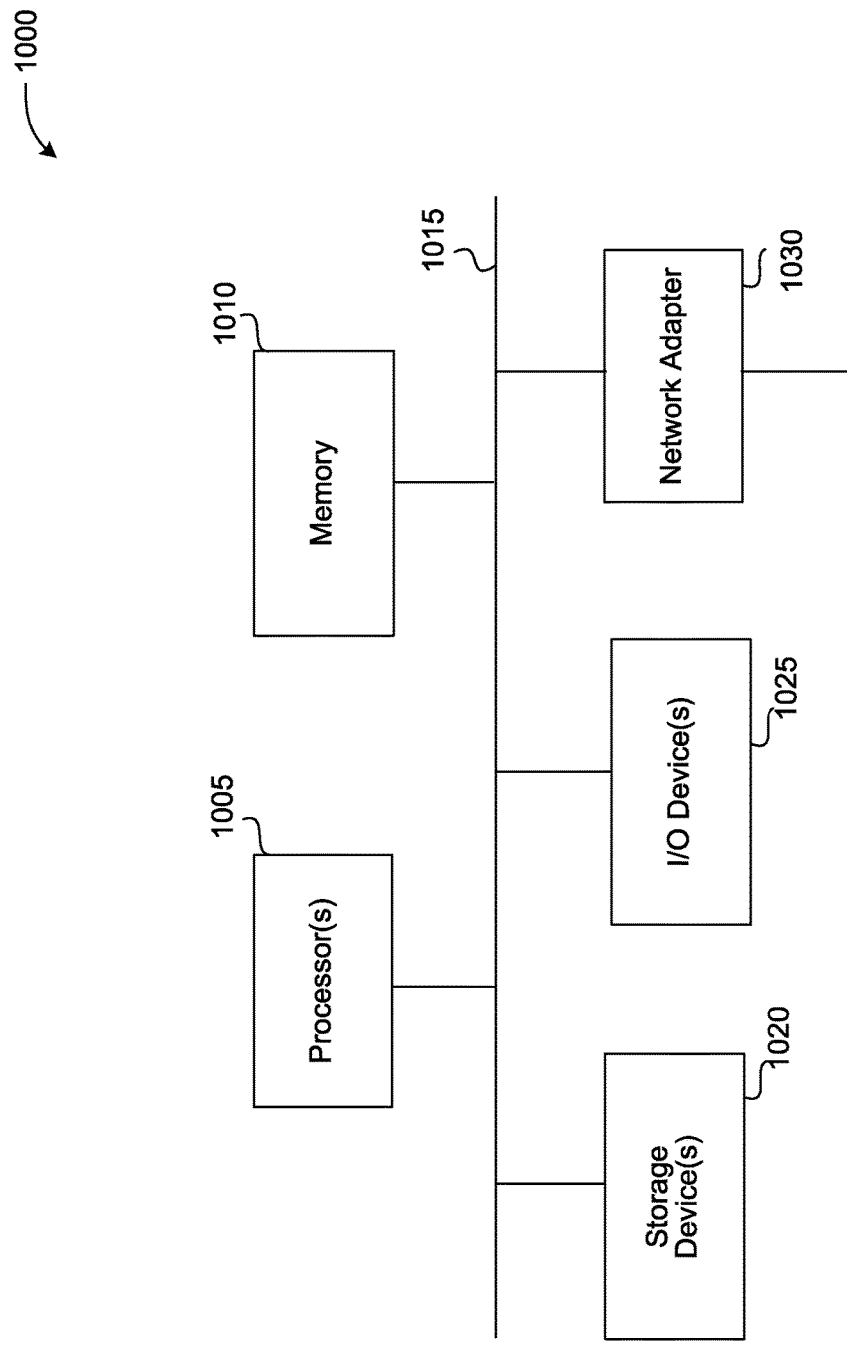
FIG. 10 is a block diagram of a processing system that can implement operations of the present invention.

FIG. 10 is a block diagram of a computer system as may be used to implement features of the disclosed embodiments. The computing system 1000 may be used to implement any of the entities, components or services depicted in the examples of FIGS. 1-9 (and any other components described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    receiving multiple feature vectors, wherein at least some of the feature vectors include a plurality of features;
    receiving multiple decision trees by which the feature vectors are to be evaluated;
    loading the feature vectors into a memory of the computing system; and
    loading disjoint subsets of the decision trees into the memory of the computing system successively for evaluating the feature vectors, the loading the disjoint subsets successively including:
        loading a first subset of the disjoint subsets into the memory,
        evaluating the feature vectors using the first subset to generate a first result,
        evicting the first subset from the memory,
        loading a second subset of the disjoint subsets into the memory after evicting the first subset, and
        evaluating the feature vectors using the second subset to generate a second result;
    determining whether to evaluate the feature vectors using a third subset of the disjoint subsets as a function of a variation between the first result and the second result; and
    responsive to a determination that the variation exceeds a specified threshold, loading the third subset into the memory after evicting the second subset, and evaluating the feature vectors using the third subset to generate a third result.

2. The method of claim 1, wherein loading the second subset into the memory after evicting the first subset includes loading the second subset while retaining the feature vectors in the memory.

3. The method of claim 1, wherein evaluating the feature vectors using the first subset includes:
    evaluating the feature vectors using a first decision tree of the first subset, and
    evaluating the feature vectors using a second decision tree of the first subset after evaluating using the first decision tree of the first subset.

4. The method of claim 1, wherein evaluating the feature vectors using the first subset includes:
    evaluating a first feature vector of the feature vectors using the first subset, and
    evaluating a second feature vector of the feature vectors using the first subset after evaluating the first feature vector.

5. The method of claim 1, wherein a first decision tree of the decision trees is expressed using a ternary expression.

6. The method of claim 5, wherein the ternary expression includes a categorical operator.

7. The method of claim 1, wherein the evaluating the feature vectors includes:
   evaluating a first feature vector of the feature vectors using a first decision tree of the first subset to generate a first value,
   evaluating the first feature vector using a second decision tree of the first subset to generate a second value, and
   computing a total value of the first feature vector as a function of the first value and the second value.

8. A non-transitory computer-readable storage medium storing computer-readable instructions, the instructions comprising:
   instructions for receiving multiple feature vectors and a number (m) of decision trees by which the feature vectors are to be evaluated; and
   instructions for evaluating the feature vectors using the decision trees by loading multiple subsets of the m decision trees into a memory of a computing system successively, the evaluating including:
      loading the feature vectors and a first subset of the subsets into the memory, wherein at least some of the subsets include k number of m decision trees,
      evaluating the feature vectors using the first subset to generate a first result,
      loading a second subset of the subsets into the memory after evicting the first subset, and
      evaluating the feature vectors using the second subset to generate a second result;
   instructions for determining whether to evaluate the feature vectors using a third subset of the subsets as a function of a variation between the first result and the second result; and
   instructions for loading the third subset into the memory after evicting the second subset in an event that the variation exceeds a specified threshold.

9. The non-transitory computer-readable storage medium of claim 8, wherein the instructions for evaluating the feature vectors using the decision trees include:
   instructions for determining a common feature between at least some of the feature vectors;
   instructions for determining, in evaluating a first feature vector of the feature vectors having the common feature using a first decision tree of the first subset, a path taken by the common feature in the first decision tree; and
   instructions for excluding an evaluation of the common feature using the first decision tree for the at least some of the feature vectors.

10. The non-transitory computer-readable storage medium of claim 9, wherein the instructions for excluding the evaluation of the common feature include:
   instructions for identifying at least some of the decision trees in the first subset that contain the path taken by the common feature, and
   instructions for regenerating the at least some of the decision trees by excluding the path as a specified set of decision trees.

11. The non-transitory computer-readable storage medium of claim 10, wherein the instructions for loading the first subset into the memory include instructions for loading into the memory the specified set of decision trees.

12. The non-transitory computer-readable storage medium of claim 8, wherein the instructions for evaluating the feature vectors using the decision trees include:
   instructions for evaluating the feature vectors by cascading the decision trees, the evaluating using cascading including:
      evaluating the feature vectors using the first subset of the decision trees, wherein the first subset of the decision trees are generated using a first model,
      pruning the feature vectors as a function of a result of the evaluating, to generate a pruned set of feature vectors, and
      evaluating the pruned set of feature vectors using the second subset of the decision trees, wherein the second subset of the decision trees are generated using a second model.

13. A system, comprising:
   a processor; and
   a storage device storing instructions that, when executed by the processor, cause the system to perform operations comprising:
      receiving multiple feature vectors, wherein at least some of the feature vectors include a plurality of features;
      receiving multiple decision trees by which the feature vectors are to be evaluated;
      loading the feature vectors into a memory of the system;
      loading disjoint subsets of the decision trees into the memory of the system successively for evaluating the feature vectors, wherein the loading the disjoint subsets successively comprises:
         loading a first subset of the disjoint subsets into the memory,
         evicting the first subset from the memory after the feature vectors are evaluated using the first subset, and
         loading a second subset of the disjoint subsets into the memory after evicting the first subset, for the feature vectors to be evaluated using the second subset; and
      evaluating the feature vectors after a specified subset of the disjoint subsets is loaded into the memory by cascading the decision trees, wherein the cascading the decision trees comprises:
         evaluating the feature vectors using the first subset of the decision trees, wherein the first subset of the decision trees are generated using a first model,
         pruning the feature vectors as a function of a result of the evaluating to generate a pruned set of the feature vectors, and
         evaluating the pruned set of the feature vectors using the second subset of the decision trees, wherein the second subset of the decision trees are generated using a second model.

\* \* \* \* \*